United States Patent
Venter

(10) Patent No.: US 9,746,066 B2
(45) Date of Patent: Aug. 29, 2017

(54) GEARING ARRANGEMENT

(71) Applicant: ROLLS-ROYCE DEUTSCHLAND LTD & CO KG, Dahlewitz (DE)

(72) Inventor: Gideon Daniel Venter, Berlin (DE)

(73) Assignee: ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 0 days.

(21) Appl. No.: 14/628,776

(22) Filed: Feb. 23, 2015

(65) Prior Publication Data

US 2015/0240931 A1 Aug. 27, 2015

(30) Foreign Application Priority Data

Feb. 27, 2014 (GB) .................................. 1403413.6

(51) Int. Cl.
| | |
|---|---|
| *F16H 1/08* | (2006.01) |
| *F16H 55/44* | (2006.01) |
| *F16H 55/14* | (2006.01) |
| *F16H 55/17* | (2006.01) |
| *F16H 55/18* | (2006.01) |
| *F16H 1/28* | (2006.01) |

(52) U.S. Cl.
CPC ............ *F16H 55/14* (2013.01); *F16H 55/17* (2013.01); *F16H 55/18* (2013.01); *F16H 1/08* (2013.01); *F16H 1/28* (2013.01); *Y10T 74/19628* (2015.01)

(58) Field of Classification Search
CPC ............ F16H 1/08; F16H 55/14; F16H 55/18
See application file for complete search history.

(56) References Cited

U.S. PATENT DOCUMENTS

| | | | | |
|---|---|---|---|---|
| 3,361,002 A | * | 1/1968 | Staehlin | F16H 55/18 74/409 |
| 3,757,608 A | * | 9/1973 | Willner | F16H 1/2809 475/347 |
| 3,803,936 A | * | 4/1974 | Kroeper | F16H 55/18 74/409 |
| 5,158,493 A | * | 10/1992 | Morgrey | B62D 57/02 180/8.6 |
| 5,181,433 A | * | 1/1993 | Ueno | F16H 55/08 74/409 |

(Continued)

FOREIGN PATENT DOCUMENTS

| | | |
|---|---|---|
| DE | 924 666 C | 3/1955 |
| DE | 90 04 430 U1 | 8/1991 |

(Continued)

OTHER PUBLICATIONS

Jun. 29, 2015 Search Report issued in European Application No. 15 15 5963.

(Continued)

*Primary Examiner* — William Kelleher
*Assistant Examiner* — Gregory T Prather
(74) *Attorney, Agent, or Firm* — Oliff PLC

(57) ABSTRACT

A cylindrical double helix gear having an axis and a unitary gear arrangement extending about the axis, wherein the gear arrangement has two axially spaced gear portions with each gear portion comprising a plurality of gear teeth extending about a radial outer surface of the gear arrangement, wherein the gear portions are connected by a flexible spacer portion configured to allow relative movement between the gear portions.

19 Claims, 1 Drawing Sheet

(56) References Cited

U.S. PATENT DOCUMENTS

| | | | |
|---|---|---|---|
| 5,348,246 A * | 9/1994 | Kim | A01K 89/015 242/279 |
| 5,979,260 A * | 11/1999 | Long | F16H 55/18 464/62.1 |
| 2002/0121152 A1 | 9/2002 | White et al. | |
| 2003/0034417 A1* | 2/2003 | Tisbo | B65H 75/40 242/395 |
| 2004/0031152 A1* | 2/2004 | Jinkins | B23F 7/00 29/893 |
| 2004/0248695 A1* | 12/2004 | Wang | F16H 55/18 475/331 |
| 2005/0109144 A1* | 5/2005 | Clement | F16H 55/18 74/445 |
| 2007/0099746 A1 | 5/2007 | Hahlbeck | |
| 2007/0282358 A1* | 12/2007 | Remiszewski | A61B 17/00 606/159 |
| 2008/0207389 A1* | 8/2008 | Fahrenbach | F03D 15/00 475/344 |
| 2010/0240490 A1 | 9/2010 | Schafer | |
| 2014/0190442 A1* | 7/2014 | Saito | F16H 55/18 123/192.2 |
| 2016/0138697 A1* | 5/2016 | Kancherla | F16H 57/0006 74/409 |

FOREIGN PATENT DOCUMENTS

| | | |
|---|---|---|
| GB | 713587 A | 8/1954 |
| GB | 1231620 A | 5/1971 |
| JP | 2005-030449 A | 2/2005 |
| SU | 848806 A1 | 7/1981 |
| WO | 2009/106222 A1 | 9/2009 |

OTHER PUBLICATIONS

Sep. 24, 2014 Search Report issued in British Patent Application No. 1403413.6.

* cited by examiner

GEARING ARRANGEMENT

The present invention relates to gearing arrangements and in particular double helical gears separated by a spacer which allows relative movement between the double gears.

Double helical gears are known and are used in applications that are highly demanding where high power density and/or high speed capability are required and particularly where there is a desire to avoid axial loading. A double helical gear comprises two spaced apart helical gears, of opposite hand of helix, mounted together on a common axis. The gears may abut but are more typically separated by a cylindrical section. The helix of each gear bank may be at the same angle relative to the axis, but can also have different angles.

The gears can be difficult to manufacture to the high accuracy often required; particularly where each gear bank is independently machined. Misalignment of gear flanks from one helix bank to another can cause a load mismatch that has to be compensated for in the sizing of the two gears by providing larger, and heavier, gears. Misalignment can also generate an axial load component, either to separate or close the gear banks, which has an adverse effect on the vibration of the gears.

It is an object of the invention to seek to provide an improved double helical gear that seeks to address this and other problems.

According to a first aspect of the invention there is provided a cylindrical double helix gear having an axis and a unitary gear arrangement extending about the axis, wherein the gear arrangement has two axially spaced gear portions with each gear portion comprising a plurality of gear teeth extending about a radial outer surface of the gear arrangement, wherein the gear portions are connected by a flexible spacer portion having an array of circumferentially spaced links joining each gear portion for allowing relative movement between the gear portions.

The gear teeth in one or more of the gear portions may be oblique to the axis of the gear arrangement. The angle of the gear teeth to the axis of the gear arrangement may be different between each gear portion.

Preferably the direction of the angle of the gear teeth in one gear portion is opposite to the direction of the angle of the gear teeth in a further gear portion.

Preferably the angle of the gear teeth in the gear portions are configured to apply a tensile force on the spacer portion in use.

The relative movement may be deflection from the axis or rotation about the axis.

The spacer portion may be cylindrical. The spacer portion may be hollow

The spacer portion may have an array of circumferentially spaced links joining each gear portion. The array of spaced links may extend around the circumference of the gear arrangement. Each link may be spaced from an adjacent link by an aperture.

Although specific for a given application it is preferred that each link has an axial length between gear portions, a circumferential width and a radial height, wherein the axial length is greater than the circumferential width According to a second aspect of the invention there is provided a cylindrical double helix gear as discussed above, wherein the gear arrangement is hollow and has an inner surface defining a gear bore and an outer surface; wherein the minimum inner radius of the gear arrangement is the largest radius at which a circle drawn about the axis fits within the bore without intersecting the inner surface; wherein the maximum outer radius of the gear arrangement is the smallest radius at which a circle drawn about the axis intersects the outer surface; wherein the radial distance between the minimum inner radius and the maximum outer radius is less than ⅓ of the maximum outer radius.

Preferably the radial distance between the minimum inner radius and the maximum outer radius is less than ¼ of the maximum outer radius.

Preferably the radial distance between the minimum inner radius and the maximum outer radius is less than ⅕ of the maximum outer radius.

According to a third aspect of the invention there is provided a gearbox having a cylindrical double helix gear as discussed above.

The double helix gear may be produced from a unitary piece of material with the flexible spacer being integral with the gear banks.

The invention will now be described by way of example only and with reference to the accompanying images, in which.

Figure 1:
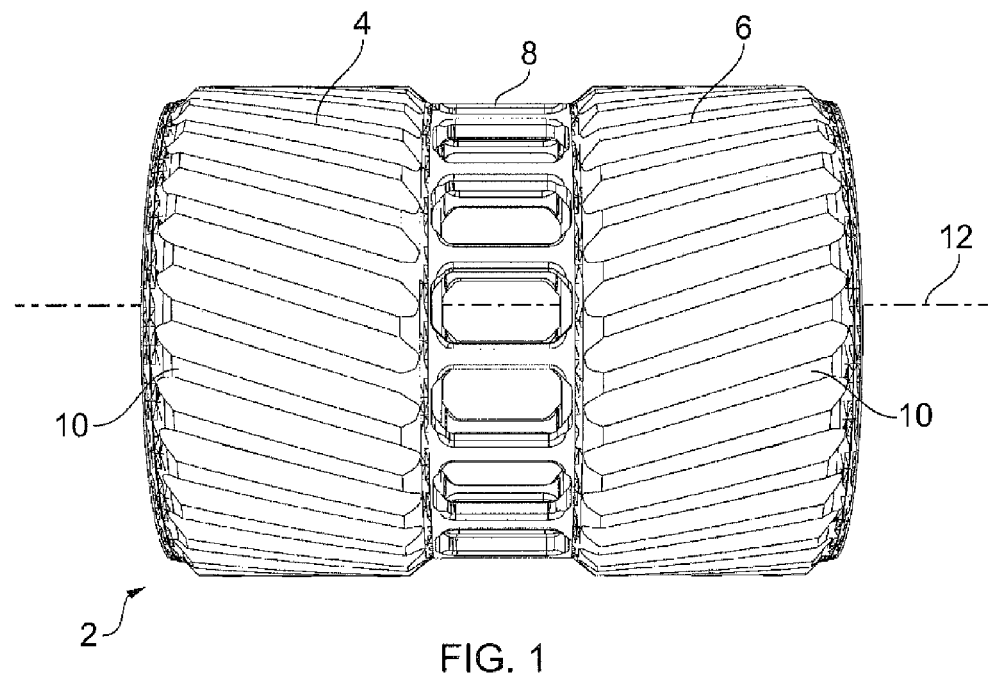
FIG. 1 depicts a double helix gear in accordance to the invention.

A cylindrical double helix gear is depicted in FIG. 1. The gear 2 has a first gear bank 4, a second gear bank 6 and a connector 8 that joins the first and second gear banks in a unitary arrangement. Each of the gear banks has a circumferential array of circumferentially spaced gear teeth 10 that are arranged at an oblique angle to the axis 12 of the double helix gear 2.

The angle of the teeth and the tooth spacing can be selected and dependent on the application in which the gear is to be used. Each gear bank may have a different angle and gear spacing to the other gear bank. It is preferred that the angle of the teeth in each bank is of an opposite hand to the angle of the teeth in the other bank. Advantageously this allows the gear banks to create an axial tension in the connector 8 when loaded in the drive direction.

The gear arrangement is such that no, or minimal, torque transfer is generated from one gear bank to the other gear bank. Any torque transfer is preferably limited to that generated for compensation of small mesh errors.

The connector 8 is cylindrical and has an array of links connecting the two gear banks. The links, or bars, are separated by apertures 16 and preferably extend parallel to the axis of the gear. Oblique angles relative to the axis may be used. The links have a flexibility that allows limited relative motion in all planes from one helix gear bank to the other which advantageously allows the gears to adjust themselves to the lowest mesh loading position that helps to equalise load sharing between the two gear banks.

Figure 2:
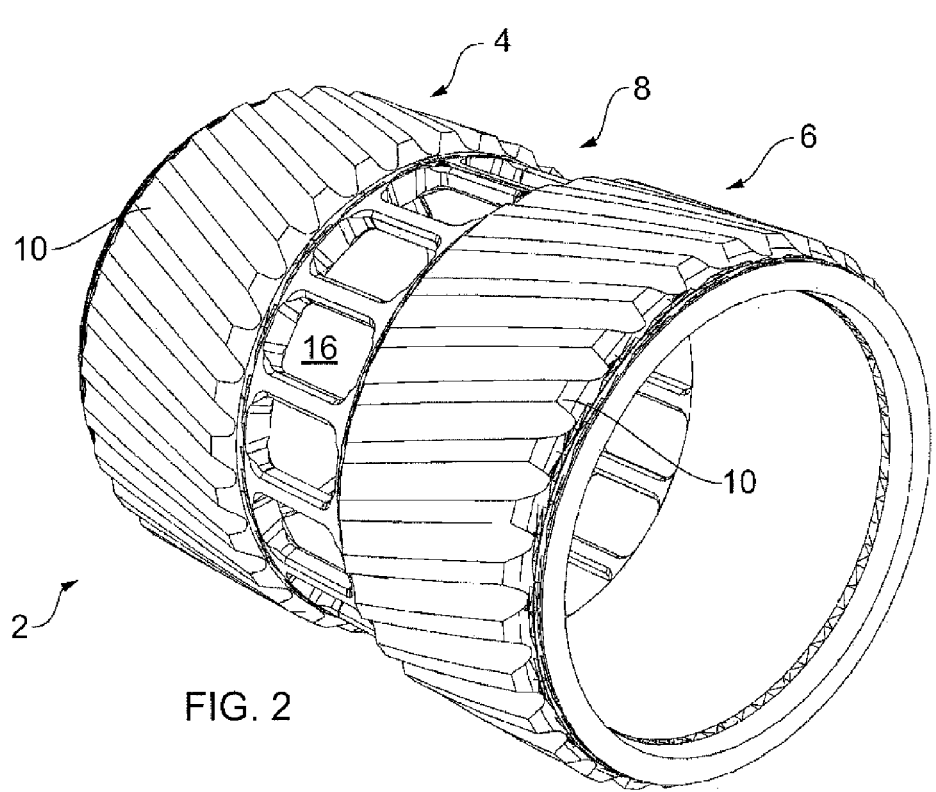
FIG. 2 is a perspective view of the gear of FIG. 1.

The ability to equalise load sharing allows the weight of the gear to be kept low and, as shown in FIG. 2, allows the gear to be manufactured from a hollow tube. The connector has a slightly smaller outer radius than the outer radius of the gear banks to aid manufacturing. The connector can be first machined to the smaller radius before the teeth are formed in the banks, which allows the machining tool unrestrained lead-in and lead-out between the formed gear teeth. The pockets, or apertures, can be machined before or after formation of the gear teeth but preferably they are machined after formation of the teeth as a stiffer connector may be required to react the tooth machining forces. The bore of the gear arrangement may be drilled once the teeth have been machined.

The radial distance between the minimum inner radius, which is the largest radius at which a circle drawn about the axis fits within the bore without intersecting the inner surface of the gear, and the maximum outer radius, which is the smallest radius at which a circle drawn about the axis intersects the outer surface, is less than $\frac{1}{3}^{rd}$ of the maximum outer radius. In some arrangements the radial distance between the minimum inner radius, which is the largest radius at which a circle drawn about the axis fits within the bore without intersecting the inner surface of the gear, and the maximum outer radius, which is the smallest radius at which a circle drawn about the axis intersects the outer surface may be $\frac{1}{5}^{th}$ or less of the maximum outer radius.

The double helix gear described above finds particular application in a gear train or epicyclic gearbox where it functions as a planet gear or idler gear. The gear may be used at the end of a gear train, but if used to extract or input power a drive interface must be provided for both gear banks and must not constrain the flexibility of the connector. The apertures and hollow gear arrangement permits a low resistance to lubricant flow around the gear and from the inside of the gear arrangement to the outside which aids the removal of heat from the gearbox.

Epicyclic gears may be used in gas turbines to set the speed of a fan relative to a rotating input shaft, and in wind turbines too. Gearing systems incorporating the double helix gear may also find use in marine applications e.g. sub or above sea turbines or on ships or other sea, or water borne structures or vehicles.

It will also be appreciated that the double helix gear described in this invention may be used as a replacement for conventional double helix gears as will be readily apparent to a person of skill in the art.

It will be understood that the L/D ratio for the double helix gear may be greater or less than 1 and the material and/or other details of the gear including, but not limited to, tooth angle or tooth length may also be selected as appropriate by a person of skill in the art for the intended application of the gear.

Although the disclosure has been described with respect to the gear teeth in each gear bank being arranged at an oblique angle to the axis of the gear it will be appreciated that for some specific applications one of more of the arrays of gear teeth may be parallel to the axis. In some arrangements the gear teeth may be at an acute angle to the axis of the gear. 3, 4, or more, gear banks may be provided for some applications with one or more of the gear banks being separated by a flexible spacer.

It will be appreciated that the invention provides a simple and elegant arrangement that improves load sharing between gear banks that results in smaller and lighter gears. The use of the pockets or apertures in the connector further reduces the weight of the gear. The limited flexibility of the spring bars reduces the wear and vibration of the gear and give greater gear reliability and life.

Where the gear banks of the double helix gear are of the same hand the flexible spacer portions may improve the manufacturability of wider gears. It may be necessary to provide an appropriate mechanism to react axial forces assists in the manufacture of wide gears that can be difficult to manufacture conventionally.

The invention claimed is:

1. A cylindrical double gear comprising
a one-piece gear arrangement that is spokeless, the gear arrangement extending about an axis and including (i) a pair of axially spaced gear portions with each gear portion comprising a plurality of gear teeth extending about a radial outer surface of the gear arrangement, and (ii) a cylindrical flexible spacer portion connecting the gear portions,
wherein the spacer portion has an array of circumferentially spaced links joining each gear portion configured to allow relative movement between the gear portions.

2. The cylindrical double gear according to claim 1, wherein the gear teeth of at least one of the gear portions are oblique to the axis of the gear arrangement.

3. The cylindrical double gear according to claim 2, wherein the direction of the angle of the gear teeth in a first gear portion is opposite to the direction of the angle of the gear teeth in a second gear portion.

4. The cylindrical double gear according to claim 1, wherein the angle of the gear teeth to the axis of the gear arrangement is different between each gear portion.

5. The cylindrical double gear according to claim 1, wherein the relative movement is deflection from the axis.

6. The cylindrical double gear according to claim 1, wherein the relative movement is rotation about the axis.

7. The cylindrical double gear according to claim 1, wherein the array of spaced links extends around the circumference of the spacer portion.

8. The cylindrical double gear according to claim 7, wherein each link is spaced from an adjacent link by an aperture.

9. The cylindrical double gear according to claim 7, wherein each link has an axial length between gear portions, a circumferential width and a radial height, wherein the axial length is greater than the circumferential width.

10. The cylindrical double gear according to claim 9, wherein the axial length is greater than the radial height.

11. The cylindrical double gear according to claim 1, wherein:
the gear arrangement is hollow and has an inner surface defining a gear bore;
the minimum inner radius of the gear arrangement is the largest radius at which a circle drawn about the axis fits within the bore without intersecting the inner surface;
the maximum outer radius of the gear arrangement is the smallest radius at which a circle drawn about the axis only intersects an outermost surface of the gear teeth; and
the radial distance between the minimum inner radius and the maximum outer radius is less than $\frac{1}{3}$rd of the maximum outer radius.

12. The cylindrical double gear according to claim 1, wherein the gear portions are spaced apart from each other with the entire spacer portion between the gear portions.

13. The cylindrical double gear according to claim 11, wherein the radial distance between the minimum inner radius and the maximum outer radius is less than $\frac{1}{4}$ of the maximum outer radius.

14. The cylindrical double gear according to claim 13, wherein the radial distance between the minimum inner radius and the maximum outer radius is less than $\frac{1}{5}$th of the maximum outer radius.

15. A cylindrical double gear comprising
a hollow one-piece gear arrangement that is spokeless, the gear arrangement extending about an axis and including (i) a pair of hollow axially spaced gear portions with each gear portion comprising a plurality of gear teeth extending about a radial outer surface of the gear arrangement, and (ii) a hollow cylindrical flexible spacer portion integrally connecting the gear portions, wherein the spacer portion has an outer circumference with an array of circumferentially spaced links separated by respective apertures.

16. A cylindrical double gear comprising a hollow one-piece gear arrangement that is spokeless, the gear arrangement extending about an axis and including (i) a pair of axially spaced gear portions with each gear portion comprising a plurality of gear teeth extending about a radial outer surface of the gear arrangement, and (ii) a cylindrical flexible spacer portion connecting the gear portions, wherein:

the hollow one-piece gear arrangement has an inner surface defining a gear bore;

the minimum inner radius of the gear arrangement is the largest radius at which a circle drawn about the axis fits within the bore without intersecting the inner surface;

the maximum outer radius of the gear arrangement is the smallest radius at which a circle drawn about the axis only intersects an outermost surface of the gear teeth; and the radial distance between the minimum inner radius and the maximum outer radius is less than ⅓rd of the maximum outer radius.

17. The cylindrical double gear according to claim 16, wherein the gear teeth of at least one of the gear portions are oblique to the axis of the gear arrangement.

18. The cylindrical double gear according to claim 16, wherein the spacer portion comprises an array of spaced links extending around the circumference of the spacer portion.

19. The cylindrical double gear according to claim 18, wherein each link is spaced from an adjacent link by an aperture.

* * * * *